US008390612B2

(12) United States Patent
Chen

(10) Patent No.: US 8,390,612 B2
(45) Date of Patent: Mar. 5, 2013

(54) SOURCE DRIVER AND OPERATION METHOD THEREOF AND FLAT PANEL DISPLAY

(75) Inventor: Ying-Lieh Chen, Tainan County (TW)

(73) Assignee: Himax Technologies Limited, Tainan (TW)

( * ) Notice: Subject to any disclaimer, the term of this patent is extended or adjusted under 35 U.S.C. 154(b) by 616 days.

(21) Appl. No.: 12/623,087

(22) Filed: Nov. 20, 2009

(65) Prior Publication Data

US 2011/0122122 A1 May 26, 2011

(51) Int. Cl.
*G06F 3/038* (2006.01)
*G09G 5/00* (2006.01)

(52) U.S. Cl. ........................................................ 345/213

(58) Field of Classification Search ........................ None
See application file for complete search history.

(56) References Cited

U.S. PATENT DOCUMENTS 7,598,894 B2 * 10/2009 Chang ........................... 341/144
2004/0239668 A1 * 12/2004 Morosawa et al. ........... 345/212

* cited by examiner

*Primary Examiner* — Daniell L Negron
(74) *Attorney, Agent, or Firm* — J.C. Patents

(57) ABSTRACT

A source driver, an operation method thereof, and a flat panel display using the same are provided. The source driver includes a data channel, a switch and a switch controller. The data channel latches a pixel data according to timing of a line letch signal, and converts the latched pixel data to a driving signal for driving a display panel. The data channel decides a polarity of the driving signal according to a polarity signal. A first end of the switch is coupled to the data channel to receive the driving signal. The switch controller adjusts a pulse width of the line letch signal to obtain a control signal for controlling the switch according to the polarity signal. A pulse width of a first pulse is smaller than that of a second pulse in the control signal after the polarity signal is changed.

17 Claims, 6 Drawing Sheets

SOURCE DRIVER AND OPERATION METHOD THEREOF AND FLAT PANEL DISPLAY

BACKGROUND OF THE INVENTION

1. Field of the Invention

The present invention generally relates to a display, and more particularly, to a flat panel display having a dual gate panel.

2. Description of Related Art

In most applications, a flat panel display apparatus, such as, a thin film transistor-liquid crystal display (TFT-LCD), has served as a replacement of the conventional cathode ray tube (CRT) display apparatus. As compared with the conventional CRT display, the TFT-LCD apparatus has advantages, such as having relatively low voltage action, low power consumption, thin and small size, and light weight. To pursue better display quality, a flat panel display having a higher resolution suggests that the number of channels for the source driver and the number of data lines for the display panel would gradually increase. In order to reduce the number of channels of a source driver and the number of data lines of a display panel, a dual gate panel is developed.

FIG. 1 is a schematic diagram of a conventional dual gate panel 100. Referring to FIG. 1, on each pixel row, two neighboring sub-pixels share one data line. For example, on the pixel row SL1, the sub-pixel Pa and the sub-pixel Pb share the data line S1, and the sub-pixel Pc and the sub-pixel Pd share the data line S2. On the pixel row SL2, the sub-pixel Pe and the sub-pixel Pf share the data line S1, and the sub-pixel Pg and the sub-pixel Ph share the data line S2. Accordingly, with the application of a dual gate panel 100, the number of data lines and the number of channels of the source driver (not shown) may be reduced. Since two neighboring sub-pixels share one data line, each pixel row is disposed with two gate lines. As shown in FIG. 1, on the pixel row SL1, the sub-pixel Pa and the sub-pixel Pc are controlled by the gate line G1, while the sub-pixel Pb and the sub-pixel Pd are controlled by the gate line G2. On the pixel row SL2, the sub-pixel Pe and the sub-pixel Pg are controlled by the gate line G3, while the sub-pixel Pf and the sub-pixel Ph are controlled by the gate line G4. Similar arrangements are provided for other remaining sub-pixels.

The gate driver 120 and the source driver 130 in FIG. 1 are both controlled by the timing controller 110. Since the two neighboring sub-pixels commonly share one data line, in order to meet the specification requirement of the display, for example, maintaining the frame speed at 30 frames per second. Hence, the writing speed of the image data by the source driver 130 must increase significantly. For example, during the first half of the first horizontal scan period, the conventional gate driver 120 drives the gate line G1 to turn on the sub-pixels Pa and Pc. Concurrently, the conventional source driver 130 writes the driving signals into the sub-pixels Pa and Pc through the data lines S1 and S2. Thereafter, the conventional gate driver 120 drives the gate line G2 during the second half of the first horizontal scan period to turn on the sub-pixels Pb and Pd. At the same time, the conventional source driver 130 writes the driving signals into the sub-pixels Pb and Pd through the data lines S1 and S2. After this, the conventional gate driver 120 drives the gate line G3 during the first half of the second horizontal scan period to turn on the sub-pixels Pe and Pg. At the same time, the conventional source driver 130 writes the driving signals into the sub-pixels Pe and Pg through the data lines S1 and S2. Then, the conventional gate driver 120 drives the gate line G4 to turn on the sub-pixels Pf and Ph during the second half of the second horizontal scan period, while the conventional source driver 130 concurrently writes the driving signals into the sub-pixels Pf and Ph through the data lines S1 and S2.

As discussed above, the application of a dual gate panel 100 reduces the number of data lines. However, the data charging time of the sub-pixels is also reduced by half FIG. 2 illustrates signal waveforms of the line latch signal TP1, the polarity signal POL, and the data line S1. In FIG. 2, HP represents a horizontal scan period, HP1 represents the first half of the horizontal scan period HP, and HP2 represents the second half of the horizontal scan period HP, wherein HP1 and HP2 have the same length of the period. Since the charging time is reduced by half, driving imbalance between the first half and the second half of a same horizontal scan period often occurs. For example, as the data line S1 switches from the negative polarity to the positive polarity, the driving signals having the positive polarity are written into the sub-pixels Pa and Pb. Since the charging time is reduced by half, the sub-pixel Pa with the driving signal previously written thereinto is unable to achieve the required gray level due to a larger charging swing. For the sub-pixel Pb with the driving signal subsequently written thereinto, since the data line Si has already changed to the positive polarity, the sub-pixel Pb written with the positive polarity driving signal is able to achieve the required gray level due to a smaller charging swing. Accordingly, after the switching of polarity, driving imbalance and the generation of the mura defects likely occur to the sub-pixels (such as Pa) that are first written with the driving signal than the sub-pixels (such as Pb) that are written with the driving signal later.

SUMMARY OF THE INVENTION

In view of the foregoing, an embodiment of the invention provides a source driver and an operation method thereof, which obviate driving imbalance to occur to the sub-pixels that are first written with the driving signal and the sub-pixels that are written with the driving signal later after the switching of polarity.

An embodiment of the invention provides a flat display panel of using the same, in which the driving of the dual gate panel is balanced to obviate mura defects.

An embodiment of the invention provides a source driver including a first data channel, a first switch, and a switch controller. The first data channel latches a first pixel data according to a timing of a line latch signal and converts the latched first pixel data to a first driving signal for driving a display panel, wherein the first data channel determines a polarity of the first driving signal according to a polarity signal. A first end of the first switch is coupled to the first data channel to receive the first driving signal. The switch controller receives the line latch signal and adjusts a pulse width of the line latch signal according to the polarity signal, so as to obtain a control signal to control the first switch. Wherein, a width of a first pulse of the control signal is smaller than a width of a second pulse of the control signal after the polarity signal is changed.

An embodiment of the invention provides a flat display panel including a dual gate panel, a gate driver, and a source driver. The dual gate panel includes a first sub-pixel, a second sub-pixel, a first data line, a first gate line, and a second gate line, wherein the first and the second sub-pixels are located on a same pixel row. Data ends of the first and the second sub-pixels are coupled to the first date line. Gate ends of the first and the second sub-pixels are respectively coupled to the first and the second gate lines. The gate driver is coupled to the first gate line and the second gate line. The source driver includes a first data channel, a first switch, and a switch controller. The first data channel latches a first pixel data according to a timing of a line latch signal and converts the latched first pixel data to a first driving signal for driving a display panel, wherein the first data channel determines a polarity of the first driving signal according to a polarity signal. The first switch is coupled between the first data channel and the first data line. The switch controller receives the line latch signal and adjusts a pulse width of the line latch signal according to the polarity signal, so as to obtain a control signal to control the first switch. Wherein, a width of a first pulse of the control signal is smaller than a width of a second pulse of the control signal after the polarity signal is changed.

An embodiment of the invention provides an operation method of a source driver. The operation method includes the following steps. A first pixel data is latched in a first data channel according to a timing of a line latch signal. The latched first pixel data is converted to a first driving signal to drive a display panel through the first data channel, wherein the first data channel determines a polarity of the first driving signal according to a polarity signal. A pulse width of the line latch signal is adjusted according to the polarity signal to obtain a control signal. Wherein, a width of a first pulse of the control signal is smaller than a width of a second pulse of the control signal after the polarity signal is changed. Whether a signal path between the first data channel and the display panel is cut or not is determined according to the control signal.

In view of the above, by adjusting the time of writing the driving signal, the driving of the sub-pixels that are first written with the driving signal and the sub-pixels that are written with the driving signal later are balance after the switching of polarity, so that the mura defects are obviated in the embodiment of the invention.

To make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
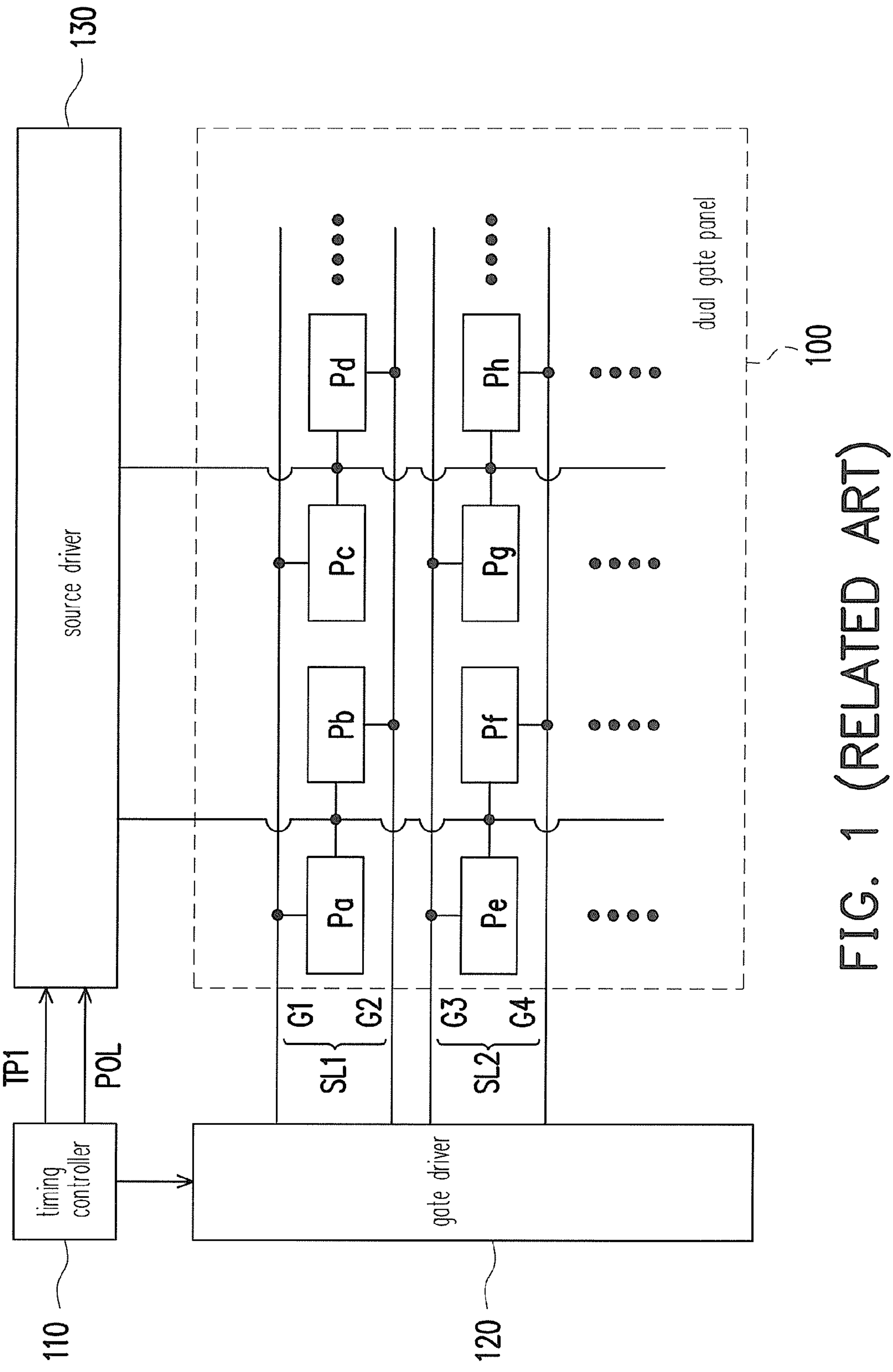
FIG. 1 (RELATED ART)
FIG. 1 is a schematic diagram of a conventional dual gate panel 100.
Figure 2:
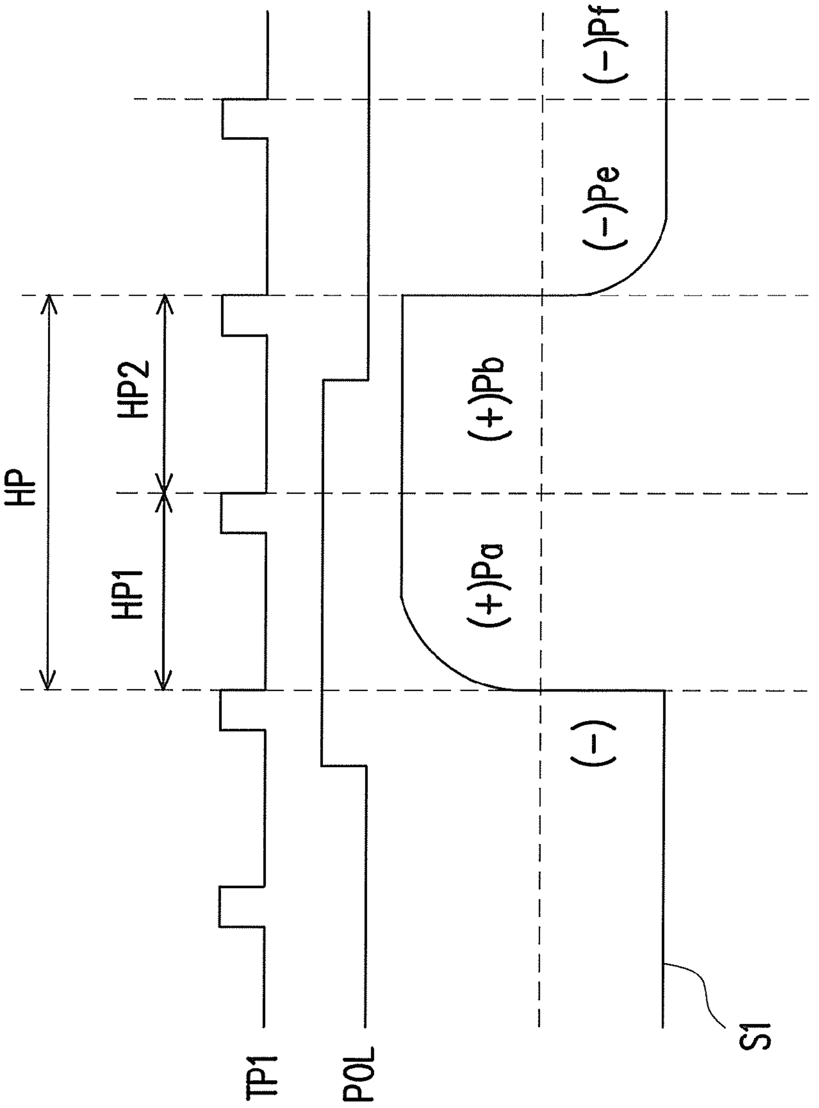
FIG. 2 (RELATED ART)
FIG. 2 illustrates signal waveforms of the line latch signal TP1, the polarity signal POL, and the data line S1.
Figure 3:
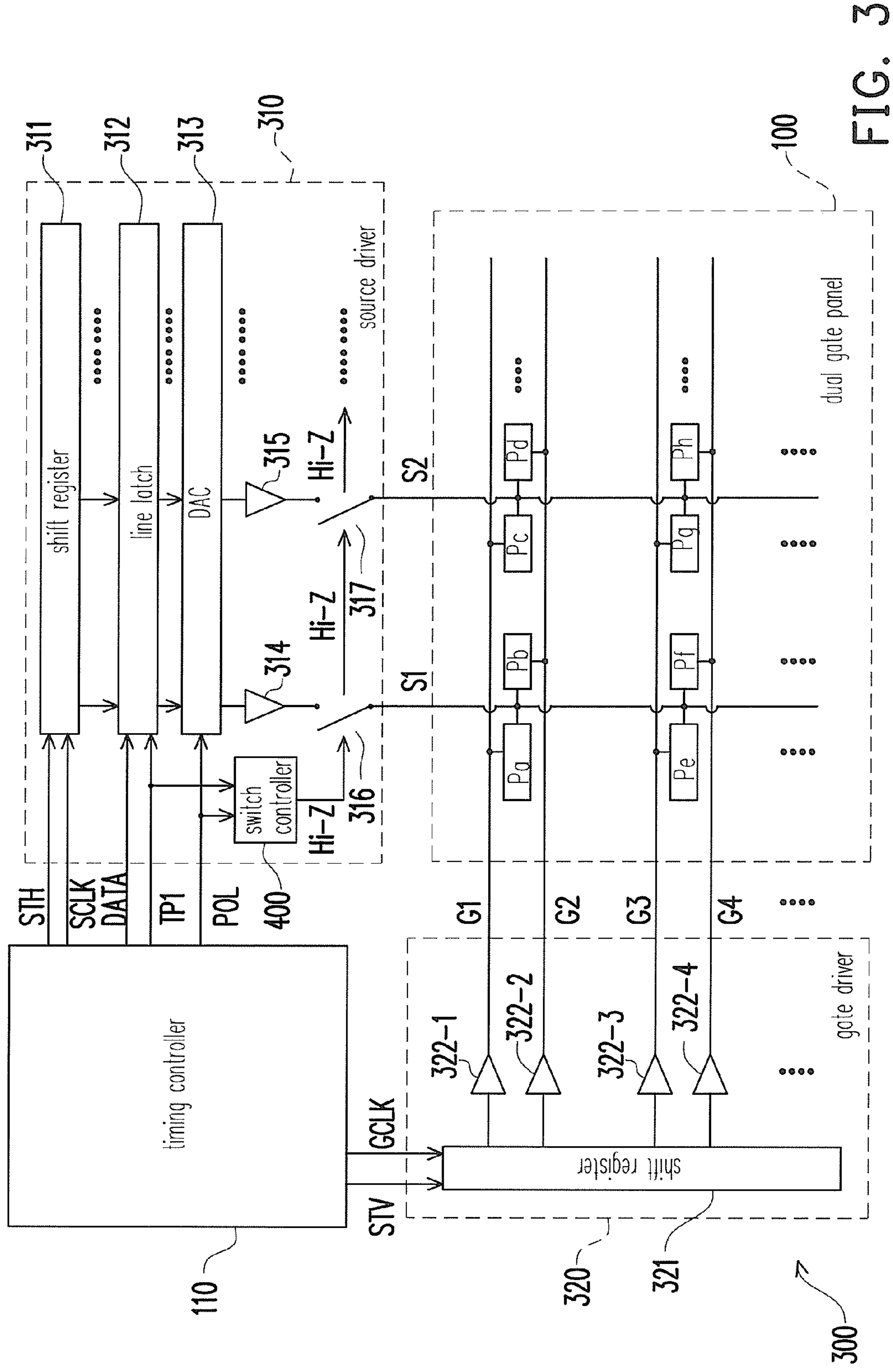
FIG. 3 is a circuit block diagram of a flat panel display according to an exemplary embodiment of the invention.

FIG. 3 is a circuit block diagram of a flat panel display 300 according to an exemplary embodiment of the invention. The flat panel display 300 includes a dual gate panel 100, a gate driver 320 and a source driver 310. The dual gate panel 100 is a liquid crystal display panel, for example. The gate driver 320 and the source driver 310 are both controlled by the timing controller 110. The dual gate panel 100 includes a plurality of sub-pixels, such as the sub-pixel Pa, the sub-pixel Pb, the sub-pixel Pc, and the sub-Pixel Pd. The sub-pixels Pa, Pb, Pc, and Pd are located on the same pixel row SL1. However, the practical layout of each sub-pixel is not limited thereto. The data ends of the sub-pixels Pa and Pb are coupled to the data line S1. The data ends of the sub-pixels Pc and Pd are coupled to the data line S2. The gate ends of the sub-pixels Pa and Pc are coupled to the gate line G1. The gate ends of the sub-pixels Pb and Pd are coupled to the gate line G2. The configuration of the remaining sub-pixels (for example, Pe, Pf, Pg and Ph) the dual gate panel 100 is similar to the above.

The gate driver 320 is coupled to the gate lines G1, G2, G3, and G4. The source driver 310 is coupled to the data lines S1 and S2. At the same frame time, the gate driver 320 drives the gate lines G1, G2, G3 and G4 in sequence, while the source driver 310 correspondingly outputs the driving signal to drive the data lines S1 and S2. In the present embodiment, the source driver 310 is controlled by the polarity signal POL to determine the polarity of the driving signal.

In the present embodiment, the gate driver 320 includes a shift register 321 and buffers 322-1, 322-2, 322-3, and 322-4. The shift register 321 transmits the start pulse STV to each channels according to the trigger timing of the gate clock GCLK provided by the timing controller 110 to provide multi-channel gate trigger signals. These gate trigger signals are outputted to the gate lines G1, G2, G3 and G4 through the output buffers (represented by the buffers 322-1, 322-2, 322-3, 322-4 in FIG. 3).

It is to be understood by a person of ordinary skill practicing this invention that different gate drivers 320, different source drivers 310, and a different combination thereof can be implemented in accordance with the present invention. For example, the source driver 310 may include a shift register 311, a line latch 312, a digital-to-analog converter (DAC) 313, output buffers 314 and 315, a first switch 316, and a second switch 317. The shift register 311 transmits the start pulse STH to each channels according to the trigger timing of the source clock SCLK provided by the timing controller 110 to provide multi-channel latch trigger signals to the line latch 312. The multi-channel line latch 312, in accordance to the timing of the latch trigger signals provided by the shift register 311, latches the digital image data DATA in the corresponding channels. According to the timing of the line latch signals TP1 provided by the timing controller 110, the multi-channel line latch 312 outputs the latched image data in all channels to the DAC 313 at the same time. Further, the multi-channel DAC 313 converts the latched digital image data to analog driving signals, and transmits the analog driving signals to corresponding data lines of the dual gate panel 100, such as the data lines S1 and S2, through the output buffers, such as the buffers 234 and 235. Accordingly, the source driver 310 can provide multiple channels to drive the corresponding data lines in the dual gate panel 100.

In FIG. 3, the source driver 310 is illustrated with the first data channel and the second data channel as an example. As in the above description, the first data channel latches the first pixel data of the pixel data DATA according to the timing of the line latch signal TP1, and converts the latched first pixel data to the first driving signal. The said first driving signal drives the first data line Si through the output buffer 314 and the first switch 316. The second data channel latches the second pixel data of the pixel data DATA according to the timing of the line latch signal TP1, and converts the latched second pixel data to the second driving signal. The said second driving signal drives the second data line S2 through the output buffer 315 and the first switch 317. Wherein, the first data channel and the second data channel determine the polarity of the first driving signal and the second driving signal according to the polarity signal POL.

The switch controller 400 receives the line latch signal TP1 and adjusts a pulse width of the line latch signal TP1 according to the polarity signal POL, so as to obtain a control signal Hi-Z. Wherein, a width of the first pulse of the control signal Hi-Z is smaller than a width of the second pulse thereof after the polarity signal POL is changed (e.g., during the period when the polarity signal POL is at a first logic level, such as the high level, or a second logic level, such as the low level). The switch controller 400 controls the first switch 316 and the second switch 317 through the control signal Hi-Z.

The first switch 316 is disposed between the first data channel and the first data line S1. The second switch 317 is disposed between the second data channel and the second data line S2. If a pulse occurs in the control signal Hi-Z, the first switch 316 and the second switch 317 are turned off. If not, the first switch 316 and the second switch 317 are turned on. Accordingly, after the switching of polarity, the sub-pixels that are first written with the driving signal have more charging time, but the sub-pixels that are written with the driving signal later have less charging time, so that the driving of the two sub-pixels are balance, and the mura defects are further obviated.

Figure 4:
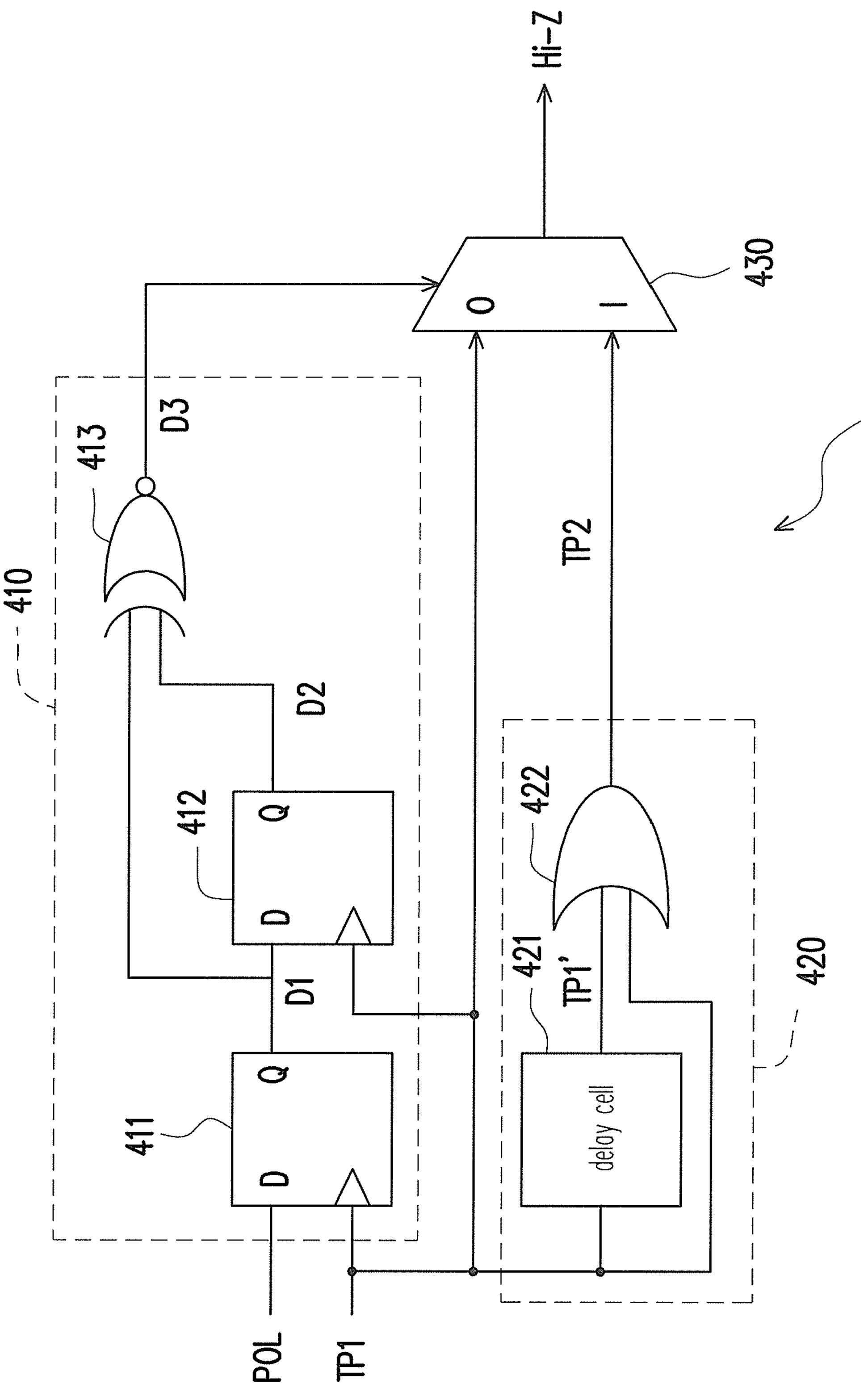
FIG. 4 is a circuit block diagram of a switch controller according to an exemplary embodiment of the invention.

It is to be understood by a person of ordinary skill practicing this invention that a different switch controller 400 can be implemented in accordance with the present invention. For example, FIG. 4 is a circuit block diagram of a switch controller 400 according to an exemplary embodiment of the invention. The switch controller 400 includes a determining unit 410, a pulse width adjusting unit 420, and a multiplexer 430. The determining unit 410 receives the line latch signal TP1 and the polarity signal POL to determine the timing of the first pulse of the line latch signal TP1 after the polarity signal POL is changed (e.g., during the period when the polarity signal POL is at the first logic level, such as the high level, or the second logic level, such as the low level). The pulse width adjusting unit 420 receives the line latch signal TP1 and adjusts the pulse width of the line latch signal TP1, so as to obtain a wide pulse signal TP2. The multiplexer 430 is controlled by a determined result D3 of the determining unit 410 to select and output one of the line latch signal TP1 and the wide pulse signal TP2 to the first switch 316 and the second switch 317.

In the present embodiment, the pulse width adjusting unit 420 includes a delay cell 421 and an OR gate 422. An input end of the delay cell 421 receives the line latch signal TP1, and an output end thereof provides the delayed line latch signal TP1'. A first input end of the OR gate 422 is coupled to an output end of the delay cell 422, and a second input end of the OR gate 422 receives the line latch signal TP1. Accordingly, pulses of the line latch signal TP1 and the delayed line latch signal TP1' can be overlapped to each other through the OR gate 422, and an output end of the OR gate 422 provides the wide pulse signal TP2 to the multiplexer 430. Herein, the delay time of the delay cell 421 can be programmable to determine the pulse width of the wide pulse signal TP2.

Figure 5:
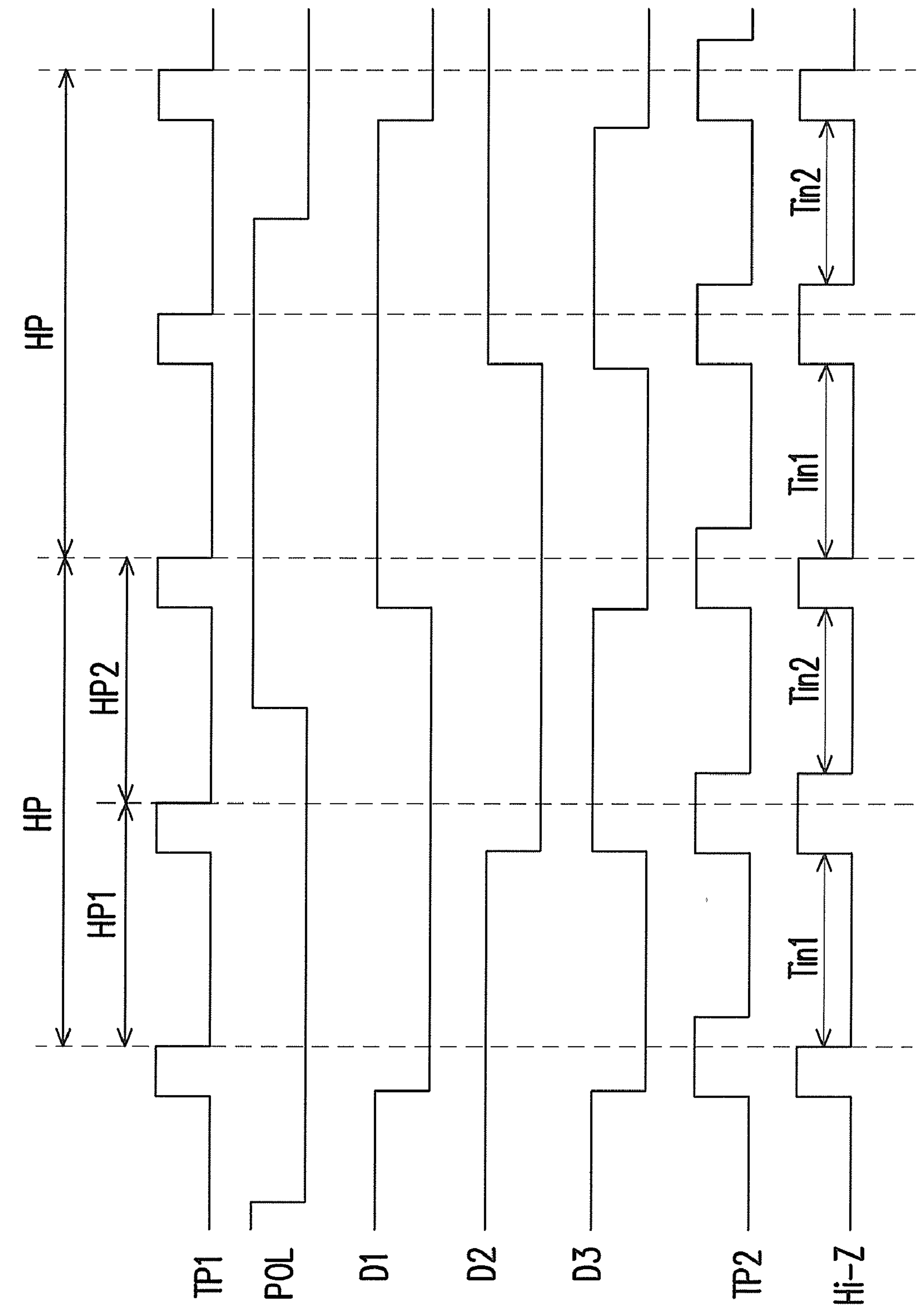
FIG. 5 is a timing diagram illustrating each signal waveform according to an exemplary embodiment of the invention shown in FIG. 4.

In the present embodiment, the determining unit 410 includes a first flip-flop 411, a second flip-flop 412, and exclusive-NOR gate 413. FIG. 5 is a timing diagram illustrating each signal waveform according to an exemplary embodiment of the invention shown in FIG. 4. Please refer to FIG. 4 and FIG. 5. Trigger ends of the first flip-flop 411 and the second flip-flop 412 both receive the line latch signal TP1. An input end of the first flip-flop 411 receives the polarity signal POL, and an output end thereof outputs a signal D1 to an input end of the second flip-flop 412. A first input end of the exclusive-NOR gate 413 is coupled to the output end of the first flip-flop 411 to receive the signal D1, a second input end of the exclusive-NOR gate 413 is coupled to an output end of the second flip-flop 412 to receive a signal D2, and an output end of the exclusive-NOR gate 413 provides a determined result D3 of the determining unit 410 to the multiplexer 430. In the determined result D3, the falling edge of the waveform represents the timing of the first pulse of the line latch signal TP1 during the period when the polarity signal POL is at the high level (or the low level), and the rising edge of the waveform represents the timing of the second pulse of the line latch signal TP1 during the period when the polarity signal POL is at the high level (or the low level). Accordingly, the multiplexer 430 switches the line latch signal TP1 and the wide pulse signal TP2 according to the determined result D3, so as to output the control signal Hi-Z to the first switch 316 and the second switch 317. As a result, the switch controller 400 controls the width of the first pulse of the control signal Hi-Z to be smaller than the width of the second pulse thereof during the period when the polarity signal POL is at the high level (or the low level).

In FIG. 5, HP represents a horizontal scan period, HP1 represents the first half of the horizontal scan period HP, and HP2 represents the second half of the horizontal scan period HP, wherein HP1 and HP2 have the same length of the period. After the switching of polarity, i.e. after the polarity of the polarity signal POL is switched, the sub-pixels that are first written with the driving signal have more charging time, i.e. Tin1 shown in FIG. 5, but the sub-pixels that are written with the driving signal later have less charging time, i.e. Tint shown in FIG. 5, so that the driving of the two sub-pixels are balance, and the mura defects are further obviated.

Figure 6:
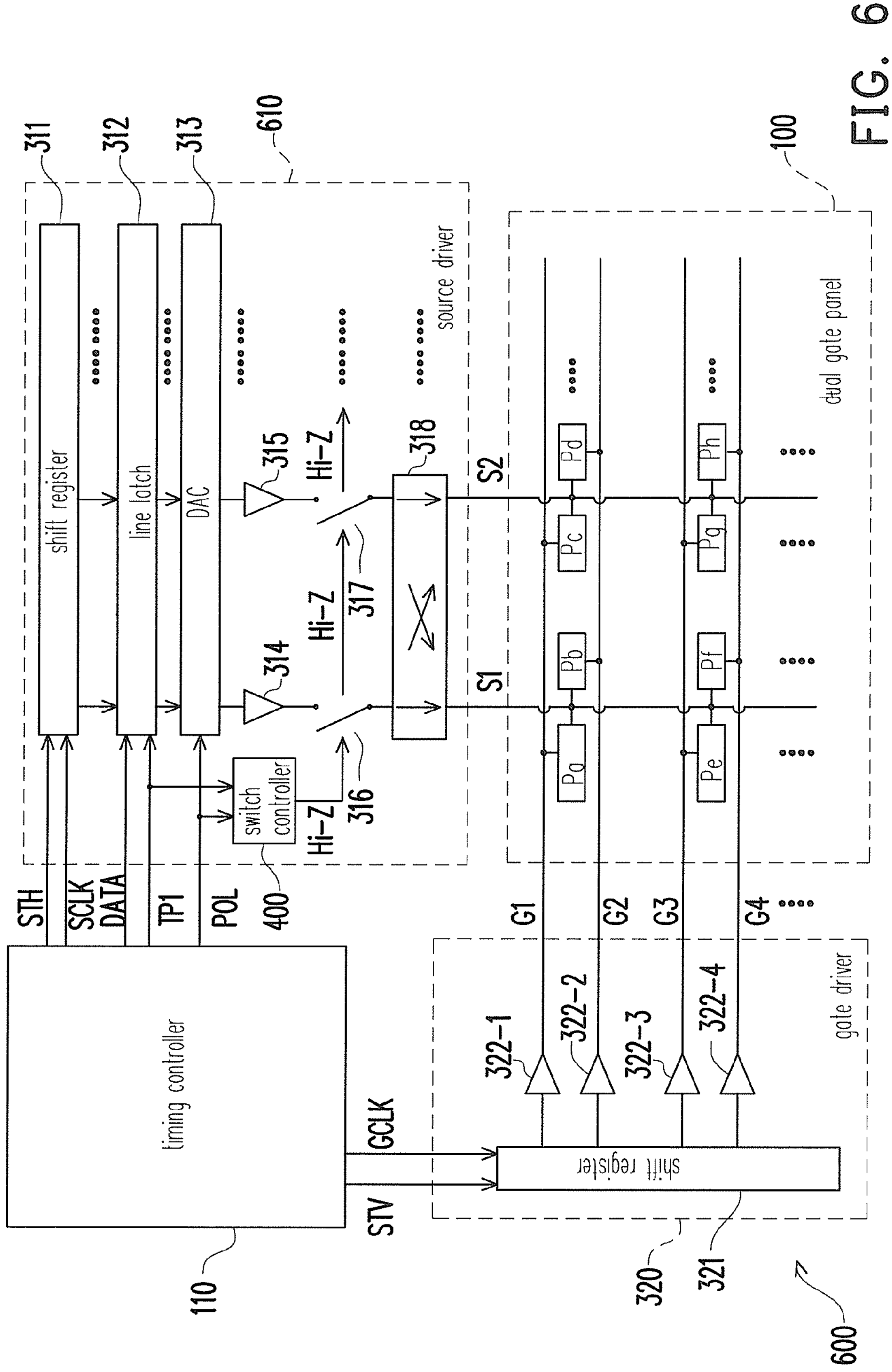
FIG. 6 is a circuit block diagram of a flat panel display according to an exemplary embodiment of the invention.

FIG. 6 is a circuit block diagram of a flat panel display 600 according to an exemplary embodiment of the invention. The flat panel display 600 includes a dual gate panel 100, a gate driver 320 and a source driver 610. The flat panel display 600 is similar to the flat panel display 300, and the same part thereof will not be described any more. The difference of the flat panel display 600 with the flat panel display 300 is that the source driver 610 further includes a switching device 318. In the source driver 610, the driving signal outputted from the first data channel and the driving signal outputted from the second data channel have different polarities. If the driving signal outputted from the first data channel has the positive polarity, the driving signal outputted from the second data channel has the negative polarity.

The switching device 318 is coupled to the first data channel, the second data channel, the first data line S1, and the second data line S2 to selectively operate in a first switching mode or a second switching mode. In the first switching mode, the switching device 318 electrically connects the first data channel to the first data line S1, and the second data channel to the second data line S2. In the second switching mode, the switching device 318 electrically connects the first data channel to the second data line S2, and the second data channel to the first data line S1. Accordingly, the first data channel and the second data channel in the source driver 610 do not require to change the polarity. Instead, the polarities of the first data line S1 and the second data line S2 is inverted by the switching device 318.

It should be noted that, the first switch 316 (the second switch 317) is disposed between the output buffer 314 (the output buffer 315) and the switching device 318 in the source driver 610 shown in FIG. 6. However, the configuration of the source driver 610 is not limited thereto. For example, in other embodiment, the first switch 316 may be disposed between the DAC 313 and the output buffer 314 or between the switching device 318 and the first data line S1.

In accordance to the above disclosure, an operation of the source driver is described as follows. The operation method includes the following steps. In the said source driver, the first data channel latches the first pixel data therein according to the timing of the line latch signal TP1. The latched first pixel data is converted to the first driving signal to drive the display panel through the first data channel, wherein the first data channel determines the polarity of the first driving signal according to the polarity signal POL. The pulse width of the line latch signal TP1 is adjusted according to the polarity signal POL to obtain the control signal Hi-Z. Wherein, the width of the first pulse of the control signal Hi-Z is smaller than the width of the second pulse thereof after the polarity signal POL is changed (e.g., during the period that the polarity signal is at the first logic level or the second logic level). Thereafter, whether a signal path between the first data channel and the display panel is cut or not is determined according to the control signal Hi-Z.

In an embodiment, the said step of adjusting the pulse width of the line latch signal TP1 to obtain the control signal Hi-Z includes the following steps. The timing of the first pulse of the line latch signal TP1 is determined after the polarity signal POL is changed (e.g., during the period when the polarity signal POL is at the first logic level or the second logic level) to obtain the determining result D3. The pulse width of the line latch signal TP1 is adjusted to obtain the wide pulse signal TP2. Finally, one of the line latch signal TP1 and the wide pulse signal TP2 is selected and outputted to serve as the control signal Hi-Z.

To sum up, in the above embodiments, after the switching of polarity, i.e. after the polarity of the polarity signal POL is switched, the width of the first pulse of the control signal Hi-Z is smaller than the width of the second pulse thereof. That is, by adjusting the time of writing the driving signal Tin1 and Tin2, the time Tin1>the time Tin2, so that the driving of the sub-pixels that are first written with the driving signal and the sub-pixels that are written with the driving signal later are balance, so that the mura defects are obviated.

Although the present invention has been described with reference to the above embodiments, it is apparent to one of the ordinary skill in the art that modifications to the described embodiments may be made without departing from the spirit of the invention. Accordingly, the scope of the invention will be defined by the attached claims not by the above detailed descriptions.

What is claimed is:

1. A source driver, comprising:

a first data channel configured to latch a first pixel data according to a timing of a line latch signal and convert the latched first pixel data to a first driving signal for driving a display panel, wherein the first data channel determines a polarity of the first driving signal according to a polarity signal;

a first switch having a first end coupled to the first data channel to receive the first driving signal; and a switch controller receiving the line latch signal and the polarity signal, and adjusting a pulse width of the line latch signal according to the polarity signal, so as to obtain a control signal to control the first switch, wherein the control signal can be the line latch signal, or the control signal can be a wide pulse signal obtained by adjusting the line latch signal according to the polarity signal such that a width of a first pulse of the wide pulse signal is smaller than a width of a second pulse of the wide pulse signal after the polarity signal is changed, the switch controller decides the control signal to be the line latch signal or the wide pulse signal according to the polarity signal.

2. The source driver as claimed in claim 1, further comprising:

a second data channel configured to latch a second pixel data according to the timing of the line latch signal and convert the latched second pixel data to a second driving signal for driving the display panel, wherein the second data channel determines a polarity of the second driving signal according to the polarity signal;

a second switch having a first end coupled to the second data channel to receive the second driving signal, and the second switch is controlled by the control signal.

3. The source driver as claimed in claim 2, wherein the polarity of the second driving signal is different from the polarity of the first driving signal.

4. The source driver as claimed in claim 3, further comprising:

a switching device coupled to the first data channel, the second data channel, a first data line of the display panel, and a second data line of the display panel to selectively operate in a first switching mode or a second switching mode, wherein the switching device electrically connects the first data channel and the second data channel respectively to the first data line and the second data line in the first switching mode, and connects the first data channel and the second data channel respectively to the second data line and the first data line in the second switching mode.

5. The source driver as claimed in claim 1, wherein the switch controller comprises:

a determining unit receiving the line latch signal and the polarity signal to determine a timing of a first pulse of the line latch signal after the polarity signal is changed;

a pulse width adjusting unit receiving the line latch signal and adjusting the pulse width of the line latch signal, so as to obtain the wide pulse signal; and a multiplexer controlled by a determined result of the determining unit to select and output one of the line latch signal and the wide pulse signal to the first switch.

6. The source driver as claimed in claim 5, wherein the determining unit comprises:

a first flip-flop, wherein an input end thereof receives the polarity signal, and a trigger end thereof receives the line latch signal;

a second flip-flop, wherein an input end thereof is coupled to an output end of the first flip-flop, and a trigger end of the second flip-flop receives the line latch signal; and an exclusive-NOR (XNOR) gate, wherein a first input end and a second input end thereof are respectively coupled to the output end of the first flip-flop and an output end of the second flip-flop, and the XNOR gate outputs the determined result of the determining unit to the multiplexer.

7. The source driver as claimed in claim 5, wherein the pulse width adjusting unit comprises:

a delay cell, wherein an input end thereof receives the line latch signal, and an output end thereof provides the delayed line latch signal; and an OR gate, wherein a first input end thereof is coupled to an output end of the delay cell, a second input end of the OR gate receives the line latch signal, and an output end of the OR gate provides the wide pulse signal to the multiplexer.

8. A flat panel display, comprising:

a dual gate panel comprising a first sub-pixel, a second sub-pixel, a first data line, a first gate line, and a second gate line, wherein the first and the second sub-pixels are located on a same pixel row, data ends of the first and the second sub-pixels are coupled to the first date line, a gate end of the first sub-pixel is coupled to the first gate line, and a gate end of the second sub-pixel is coupled to the second gate line;

a gate driver coupled to the first gate line and the second gate line; and a source driver, comprising:

a first data channel configured to latch a first pixel data according to a timing of a line latch signal and convert the latched first pixel data to a first driving signal for driving a display panel, wherein the first data channel determines a polarity of the first driving signal according to a polarity signal;

a first switch coupled between the first data channel and the first data line; and a switch controller receiving the line latch signal and the polarity signal, and adjusting a pulse width of the line latch signal according to the polarity signal, so as to obtain a control signal to control the first switch, wherein the control signal can be the line latch signal, or the control signal can be a wide pulse signal obtained by adjusting the line latch signal according to the polarity signal such that a width of a first pulse of the wide pulse signal is smaller than a width of a second pulse of the wide pulse signal after the polarity signal is changed, the switch controller decides the control signal to be the line latch signal or the wide pulse signal according to the polarity signal.

9. The flat panel display as claimed in claim 8, wherein the dual gate panel further comprises a third sub-pixel, a fourth sub-pixel, a second data line, wherein the first, the second, the third, and the fourth sub-pixels are located on the same pixel row, data ends of the third and the fourth sub-pixels are coupled to the second date line, a gate end of the third sub-pixel is coupled to the first gate line, a gate end of the fourth sub-pixel is coupled to the second gate line, and the source driver further comprises:

a second data channel configured to latch a second pixel data according to the timing of the line latch signal and convert the latched second pixel data to a second driving signal for driving the display panel, wherein the second data channel determines a polarity of the second driving signal according to the polarity signal; and a second switch coupled between the second data channel and the second data line, wherein the second switch is controlled by the control signal.

10. The flat panel display as claimed in claim 9, wherein the polarity of the second driving signal is different from the polarity of the first driving signal.

11. The flat panel display as claimed in claim 10, wherein the source driver further comprises:

a switching device coupled to the first data channel, the second data channel, the first data line, and the second data line to selectively operate in a first switching mode or a second switching mode, wherein the switching device electrically connects the first data channel and the second data channel respectively to the first data line and the second data line in the first switching mode, and connects the first data channel and the second data channel respectively to the second data line and the first data line in the second switching mode.

12. The flat panel display as claimed in claim 8, wherein the switch controller comprises:

a determining unit receiving the line latch signal and the polarity signal to determine a timing of a first pulse of the line latch signal after the polarity signal is changed;

a pulse width adjusting unit receiving the line latch signal and adjusting the pulse width of the line latch signal, so as to obtain the wide pulse signal; and a multiplexer controlled by a determined result of the determining unit to select and output one of the line latch signal and the wide pulse signal to the first switch.

13. The flat panel display as claimed in claim 12, wherein the determining unit comprises:

a first flip-flop, wherein an input end thereof receives the polarity signal, and a trigger end thereof receives the line latch signal;

a second flip-flop, wherein an input end thereof is coupled to an output end of the first flip-flop, and a trigger end of the second flip-flop receives the line latch signal; and an exclusive-NOR (XNOR) gate, wherein a first input end and a second input end thereof are respectively coupled to the output end of the first flip-flop and an output end of the second flip-flop, and the XNOR gate outputs the determined result of the determining unit to the multiplexer.

14. The flat panel display as claimed in claim 12, wherein the pulse width adjusting unit comprises:

a delay cell, wherein an input end thereof receives the line latch signal, and an output end thereof provides the line latch signal delayed; and an OR gate, wherein a first input end thereof is coupled to an output end of the delay cell, a second input end of the OR gate receives the line latch signal, and an output end of the OR gate provides the wide pulse signal to the multiplexer.

15. The flat panel display as claimed in claim 8, wherein the dual gate panel is a liquid crystal display panel.

16. An operation method of a source driver, comprising:

latching a first pixel data in a first data channel according to a timing of a line latch signal;

converting the latched first pixel data to a first driving signal for driving a display panel through the first data channel, wherein the first data channel determines a polarity of the first driving signal according to a polarity signal;

adjusting a pulse width of the line latch signal according to the polarity signal to obtain a control signal, wherein the control signal can be the line latch signal, or the control signal can be a wide pulse signal obtained by adjusting the line latch signal according to the polarity signal such that a width of a first pulse of the wide pulse signal is smaller than a width of a second pulse of the wide pulse signal after the polarity signal is changed; and determining whether a signal path between the first data channel and the display panel is cut or not according to the control signal.

17. The operation method of the source driver as claimed in claim 16, wherein the step of adjusting the pulse width of the line latch signal to obtain the control signal comprises:

determining a timing of a first pulse of the line latch signal after the polarity signal is changed to obtain a determining result;

adjusting the pulse width of the line latch signal to obtain the wide pulse signal; and selecting and outputting one of the line latch signal and the wide pulse signal to serve as the control signal in accordance with the determining result.

* * * * *